(12) United States Patent
Inoue

(10) Patent No.: US 11,797,659 B2
(45) Date of Patent: *Oct. 24, 2023

(54) AUTHENTICATION DEVICE, AUTHENTICATION SYSTEM, AND AUTHENTICATION METHOD

(71) Applicant: NEC Corporation, Tokyo (JP)

(72) Inventor: Tomoki Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/970,734

(22) Filed: Oct. 21, 2022

(65) Prior Publication Data

US 2023/0043300 A1    Feb. 9, 2023

Related U.S. Application Data

(63) Continuation of application No. 16/281,297, filed on Feb. 21, 2019, now Pat. No. 11,593,465, which is a (Continued)

(30) Foreign Application Priority Data

Jun. 19, 2014   (JP) .................................. 2014-126353

(51) Int. Cl.
*G06F 21/32* (2013.01)
*H04L 9/32* (2006.01)
*H04L 9/40* (2022.01)

(52) U.S. Cl.
CPC ................ *G06F 21/32* (2013.01); *H04L 9/32* (2013.01); *H04L 63/0861* (2013.01)

(58) Field of Classification Search
CPC ............ G06F 21/32; G06F 2221/2103; G06F 2221/2133; H04L 63/0861; H04L 63/0846;

(Continued)

(56) References Cited

U.S. PATENT DOCUMENTS 6,072,894 A    6/2000 Payne
7,516,220 B1 *    4/2009 Stiert ...................... G06F 21/55
                                                                   709/225

(Continued)

FOREIGN PATENT DOCUMENTS

JP    S63-085698 A    4/1988
JP    H09-179583 A    7/1997

(Continued)

OTHER PUBLICATIONS

Japanese Office Action for JP Application No. 2020-071774 dated Dec. 7, 2021 with English Translation.

(Continued)

*Primary Examiner* — Khalid M Almaghayreh
(74) *Attorney, Agent, or Firm* — Sughrue Mion, PLLC

(57) ABSTRACT

In order to improve the safety and reliability of services provided by a computer, an authentication device (1) equipped with a transmission unit (15) and a determination unit (16) is provided. The transmission unit (15) transmits a challenge to a terminal device (7) where the challenge is presented to a user (8) to be authenticated, the challenge being information serving as the basis on which the user inputs information to be used for authentication processing. At this time, the transmission unit (15) transmits a plurality of different challenges to the terminal device (7). The determination unit (16) determines not only whether or not a response input to the terminal device (7) by the user (8) in response to each challenge is correct, but also whether or not time information regarding the challenge and the response thereto satisfies a condition regarding the response.

43 Claims, 10 Drawing Sheets

Related U.S. Application Data continuation of application No. 15/317,195, filed as application No. PCT/JP2015/002926 on Jun. 11, 2015, now Pat. No. 11,429,700.

(58) Field of Classification Search
CPC ......... H04L 63/08; H04L 63/108; H04L 9/32; H04L 9/3231; H04L 9/3228
See application file for complete search history.

(56) References Cited

U.S. PATENT DOCUMENTS

| | | | |
|---|---|---|---|
| 8,533,485 B1 | 9/2013 | Bansal | H04L 63/08 360/243 |
| 8,856,541 B1* | 10/2014 | Chaudhury | G06V 40/67 726/16 |
| 8,904,493 B1* | 12/2014 | Dibble | H04L 63/08 726/4 |
| 8,924,484 B2* | 12/2014 | Wilson | G06Q 10/107 709/206 |
| 9,251,401 B1* | 2/2016 | Koo | G06V 40/67 |
| 9,281,945 B2 | 3/2016 | Voice | H04L 63/0245 |
| 9,342,677 B2 | 5/2016 | Ali | H04L 63/0861 |
| 9,348,989 B2* | 5/2016 | Herger | G06F 21/83 |
| 9,485,237 B1* | 11/2016 | Johansson | H04L 9/3271 |
| 2003/0115474 A1 | 6/2003 | Khan | G06F 21/32 713/186 |
| 2004/0062423 A1* | 4/2004 | Doi | G06V 40/16 382/118 |
| 2006/0036868 A1 | 2/2006 | Cicchitto | G06F 21/305 713/182 |
| 2008/0098464 A1* | 4/2008 | Mizrah | G06F 21/36 726/5 |
| 2008/0209545 A1 | 8/2008 | Asano | H04L 9/3273 725/19 |
| 2009/0044264 A1* | 2/2009 | Ramanathan | H04L 63/08 713/186 |
| 2009/0092294 A1* | 4/2009 | Uchida | G06V 40/171 382/118 |
| 2009/0131015 A1 | 5/2009 | Bentley | H04L 63/08 455/411 |
| 2009/0133106 A1* | 5/2009 | Bentley | G06F 21/32 726/5 |
| 2009/0292641 A1 | 11/2009 | Weiss | G06F 21/32 705/66 |
| 2009/0309702 A1* | 12/2009 | Hirai | G06V 40/172 340/5.83 |
| 2010/0106502 A1 | 4/2010 | Farrell | G10L 17/00 704/246 |
| 2010/0287369 A1 | 11/2010 | Monden | G06F 21/32 713/156 |
| 2011/0087611 A1 | 4/2011 | Chetal | |
| 2011/0090898 A1 | 4/2011 | Patel | H04L 65/4015 370/352 |
| 2011/0185311 A1* | 7/2011 | King | G06F 21/36 715/794 |
| 2011/0202994 A1 | 8/2011 | Hicks | |
| 2012/0019379 A1* | 1/2012 | Ben Ayed | G06F 21/32 340/5.82 |
| 2012/0054834 A1* | 3/2012 | King | G06F 21/31 726/4 |
| 2012/0059897 A1 | 3/2012 | Barriga | H04L 9/3271 709/206 |
| 2012/0081282 A1* | 4/2012 | Chin | G06F 3/011 345/156 |
| 2012/0140993 A1* | 6/2012 | Bruso | G06V 40/40 382/118 |
| 2012/0214472 A1 | 8/2012 | Tadayon | H04M 3/53 455/418 |
| 2012/0296651 A1 | 11/2012 | Wang | |
| 2012/0297190 A1* | 11/2012 | Shen | H04L 9/0866 713/168 |
| 2013/0015946 A1* | 1/2013 | Lau | G06V 40/172 340/5.2 |
| 2013/0044055 A1* | 2/2013 | Karmarkar | G06F 21/32 345/158 |
| 2013/0133055 A1* | 5/2013 | Ali | H04W 12/065 726/7 |
| 2013/0160098 A1* | 6/2013 | Carlson | G06F 21/31 726/6 |
| 2013/0173484 A1* | 7/2013 | Wesby | G06K 7/1417 705/318 |
| 2013/0179958 A1 | 7/2013 | Fujiwara et al. | |
| 2013/0225129 A1 | 8/2013 | Norbisrath | H04L 63/105 455/411 |
| 2013/0263238 A1 | 10/2013 | Bidare | G07C 9/00087 726/7 |
| 2013/0298208 A1 | 11/2013 | Ayed | G06F 21/00 726/6 |
| 2014/0010357 A1* | 1/2014 | Krishnan | H04M 3/4365 379/142.17 |
| 2014/0039892 A1 | 2/2014 | Mills et al. | |
| 2014/0075548 A1* | 3/2014 | Sam | G06F 21/31 726/19 |
| 2014/0150091 A1* | 5/2014 | Hicks | H04L 63/0861 726/19 |
| 2014/0230046 A1* | 8/2014 | Dewan | G06V 40/172 726/19 |
| 2014/0341445 A1* | 11/2014 | Yu | G06F 21/32 382/118 |
| 2014/0359730 A1* | 12/2014 | Hang | G06F 21/36 726/6 |
| 2015/0007289 A1* | 1/2015 | Godse | H04L 9/3271 726/7 |
| 2015/0135309 A1* | 5/2015 | Karmarkar | G06F 16/532 726/19 |
| 2015/0199005 A1* | 7/2015 | Haddon | G06F 3/013 345/163 |
| 2015/0227735 A1* | 8/2015 | Chappell | G06F 3/013 726/19 |
| 2015/0326570 A1* | 11/2015 | Publicover | G06V 40/197 382/117 |
| 2015/0331485 A1* | 11/2015 | Wilairat | G06F 1/163 345/156 |
| 2015/0349966 A1 | 12/2015 | Dimitrakos | H04L 9/3271 713/168 |
| 2016/0094547 A1 | 3/2016 | Stuntebeck | H04L 63/0861 726/7 |
| 2017/0083695 A1* | 3/2017 | San Agustin | G06V 40/18 |
| 2017/0124385 A1* | 5/2017 | Ganong | G06F 16/50 |
| 2017/0372056 A1 | 12/2017 | Narasimhan | G06F 21/36 |

FOREIGN PATENT DOCUMENTS

| | | |
|---|---|---|
| JP | 2001-222295 A | 8/2001 |
| JP | 2003-233816 A | 8/2003 |
| JP | 2005-157707 A | 6/2005 |
| JP | 2006-133930 A | 5/2006 |
| JP | 2006-164237 A | 6/2006 |
| JP | 2006-235718 A | 9/2006 |
| JP | 2006-268563 A | 10/2006 |
| JP | 2007-122400 A | 5/2007 |
| JP | 2007-300207 A | 11/2007 |
| JP | 2008-004050 A | 1/2008 |
| JP | 2008-269477 A | 11/2008 |
| JP | 2008-269556 A | 11/2008 |
| JP | 2008-276345 A | 11/2008 |
| JP | 2009-031986 A | 2/2009 |
| JP | 2009-122898 A | 6/2009 |
| JP | 2010-027035 A | 2/2010 |
| JP | 2010-218039 A | 9/2010 |
| JP | 4760049 B2 | 8/2011 |
| JP | 2011-175345 A | 9/2011 |
| JP | 2011-527475 A | 10/2011 |
| JP | 2011-221729 A | 11/2011 |
| JP | 2012-073708 A | 4/2012 |
| JP | 2012-226598 A | 11/2012 |
| JP | 2013-528841 A | 7/2013 |
| JP | 2014-056576 A | 3/2014 |

(56) References Cited

FOREIGN PATENT DOCUMENTS

| JP | 2015-528969 A | 10/2015 |
|---|---|---|
| WO | 2012/018326 A1 | 2/2012 |
| WO | 2013/100898 A1 | 7/2013 |

OTHER PUBLICATIONS

Japanese Office Action for JP Application No. 2020-071774 dated Jun. 1, 2021 with English Translation.
U.S. Office Action for U.S. Appl. No. 15/317,195 dated Oct. 5, 2020.
Japanese Office Action for JP Application No. 2018-131733 dated Dec. 10, 2019 with English Translation.
U.S. Office Action for U.S. Appl. No. 15/317,195 dated Oct. 31, 2019.
Japanese Office Action for JP Application No. 2018-131733 dated May 28, 2019 with English Translation.
Extended European Search Report for ER Application No. EP15809555.4 dated Jan. 17, 2018.
Japanese Office Action for JP Application No. 2016-529024 dated Nov. 28, 2017 with English Translation.
International Search Report for PCT Application No. PCT/JP2015/002926, dated Aug. 4, 2015.
English translation of Written opinion for PCT Application No. PCT/JP2015/002926.
I. G. Damousis, S. Argyropoulos, "Four Machine Learning Algorithms for Biometrics Fusion: A Comparative Study", Applied Computational Intelligence and Soft Computing, vol. 2012, Article ID 242401, 7 pages, 2012. (Year 2012).
Communication dated May 9, 2023 issued by the Japanese Intellectual Property Office in counterpart Japanese Application No. 2022-034037.

\* cited by examiner

Fig. 6

| CODE | TYPE | CHALLENGE | | |
|---|---|---|---|---|
| | | IMAGE A | IMAGE B | IMAGE C | VOICE |
| FD01 | FACE FORWARD | | FACE FORWARD | | "FACE FORWARD" |
| FD02 | FACE LEFTWARD | | FACE TO LEFT | | "FACE TO LEFT" |
| FD03 | FACE RIGHTWARD | | FACE TO RIGHT | | "FACE TO RIGHT" |
| FD04 | FACE UPWARD | | FACE UPWARD | | "FACE UPWARD" |
| FD05 | FACE DOWNWARD | | FACE DOWNWARD | | "FACE DOWNWARD" |

Fig. 7

| CODE | TYPE | CHALLENGE | | | |
|---|---|---|---|---|---|
| | | IMAGE A | IMAGE B | IMAGE C | VOICE |
| FE01 | NORMAL | 😊 | GIVE NORMAL FACE | NORMAL | "GIVE NORMAL FACE" |
| FE02 | HAPPY | 😊→😄 | GIVE HAPPY FACE | HAPPY | "GIVE HAPPY FACE" |
| FE03 | ANGRY | 😊→😠 | GIVE ANGRY FACE | ANGRY | "GIVE ANGRY FACE" |
| FE04 | SAD | 😊→😢 | GIVE SAD FACE | SAD | "GIVE SAD FACE" |
| FE05 | PLEASANT | 😊→😌 | GIVE PLEASANT FACE | PLEASANT | "GIVE PLEASANT FACE" |

Fig. 8

| CODE | TYPE | CHALLENGE | | | |
|---|---|---|---|---|---|
| | | IMAGE A | IMAGE B | IMAGE C | IMAGE D |
| VN01 | PRONOUNCE "1" | 1 PRONOUNCE THIS NUMBER | • PRONOUNCE THE NUMBER OF DOTS | / PRONOUNCE THE NUMBER OF LINES | 3−2=? PRONOUNCE ANSWER |
| VN02 | PRONOUNCE "2" | 2 PRONOUNCE THIS NUMBER | • • PRONOUNCE THE NUMBER OF DOTS | / / PRONOUNCE THE NUMBER OF LINES | 1+1=? PRONOUNCE ANSWER |
| VN03 | PRONOUNCE "3" | 3 PRONOUNCE THIS NUMBER | • • • PRONOUNCE THE NUMBER OF DOTS | / / / PRONOUNCE THE NUMBER OF LINES | 5−2=? PRONOUNCE ANSWER |
| VN04 | PRONOUNCE "4" | 4 PRONOUNCE THIS NUMBER | • • • • PRONOUNCE THE NUMBER OF DOTS | / / / / PRONOUNCE THE NUMBER OF LINES | 1+3=? PRONOUNCE ANSWER |
| ... | ... | ... | ... | ... | ... |

Fig. 9

| CODE | TYPE | CHALLENGE | | | |
|---|---|---|---|---|---|
| | | IMAGE A | IMAGE B | IMAGE C | IMAGE D |
| W_A | PRONOUNCE "a" | @ PRONOUNCE | A PRONOUNCE | ア PRONOUNCE | あ PRONOUNCE |
| W_I | PRONOUNCE "i" | ! PRONOUNCE | I PRONOUNCE | イ PRONOUNCE | い PRONOUNCE |
| W_U | PRONOUNCE "u" | u PRONOUNCE | U PRONOUNCE | ウ PRONOUNCE | う PRONOUNCE |
| W_E | PRONOUNCE "e" | e PRONOUNCE | E PRONOUNCE | エ PRONOUNCE | え PRONOUNCE |
| W_O | PRONOUNCE "o" | O PRONOUNCE | O PRONOUNCE | オ PRONOUNCE | お PRONOUNCE |

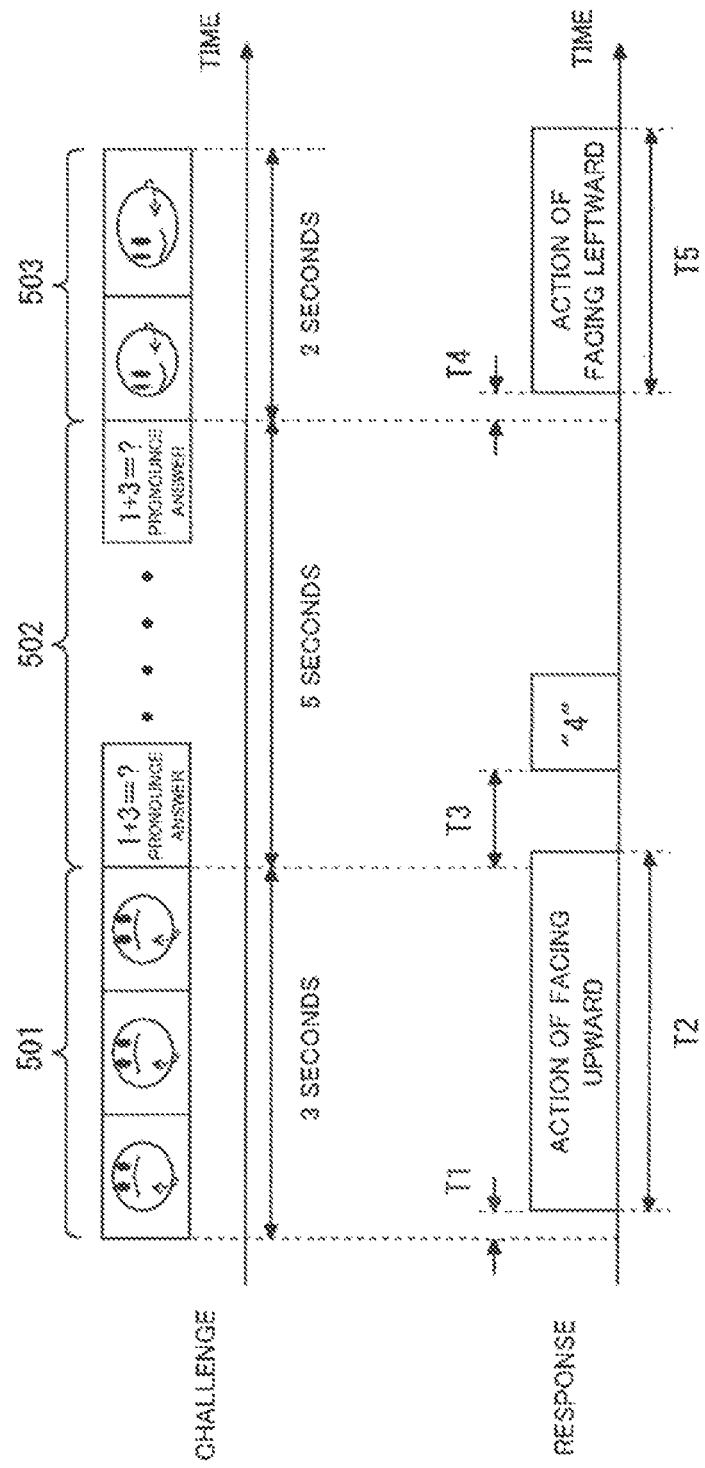

AUTHENTICATION DEVICE, AUTHENTICATION SYSTEM, AND AUTHENTICATION METHOD

REFERENCE TO RELATED APPLICATION

The present application is a continuation application of U.S. patent application Ser. No. 16/281,297 filed on Feb. 21, 2019, which is a continuation application of U.S. patent application Ser. No. 15/317,195 filed on Dec. 8, 2016, which is issued as U.S. Pat. No. 11,429,700, which is a National Stage Entry of international application No. PCT/JP2015/002926 filed on Jun. 11, 2015, which claims priority from Japanese Patent Application No. 2014-126353 filed on Jun. 19, 2014, the disclosures of all of which are incorporated in their entirety by reference herein.

TECHNICAL FIELD

The present invention relates to a technique for authentication such as identity verification.

BACKGROUND ART

To make sure that a user of online service is not a computer program (so-called bot) but a human, a CAPTCHA (Completely Automated Public Turing test to tell Computers and Humans Apart) may sometimes be used. The CAPTCHA, which is also called a reverse Turing test or human interaction proofs, is a type of challenge-response test. In the present specification, verifying whether the user of online service is a human is referred to as a verification of existence. The existence means that the user is a living human being, and not an intangible computer program.

In general, to provide safe and highly reliable online services, identity verification (personal authentication) is needed. The identity verification is a process of verifying whether the user accessing the online service is a person who is permitted to use the online service. As one example, in a process of the identity verification, determination is made as to whether a user ID (identification) and a password entered by the user match with those which are registered, and, if they are determined to match, the determination is made that the user is a person who is permitted to use the service. In another example, determination is made as to whether biometric information regarding the user matches with pre-registered biometric information, and, if the pieces of information are determined to match with each other, the determination is made that the user is the person who is permitted to use the service. Either one or both of a facial image and a voice (voice print), for example, may be used as the biometric information.

For example, a method for verifying the identity disclosed in PTL 1 includes (a) obtaining voice data and video data recorded when the user uttered the selected phrase, and (b) generating voice features and video features for identification based on the voice data and video data. The method for verifying the identity further includes (c) determining whether the user is a person in question by comparing these voice features and video features with pre-registered feature vectors.

A method for performing identity verification (personal authentication) disclosed in PTL 2 includes obtaining time-series facial images taken when a user gives utterance and determining whether the user is a person in question based on the time-series facial images. Specifically, according to PTL 2, a facial image taken immediately before the utterance is defined as a reference frame, and a facial image taken at a central time in a period of time when individual phonemes are uttered is defined as a phoneme frame. An authentication device disclosed in PTL 2 obtains feature points in the reference frame and those in the phoneme frame and determines the amount of displacement of feature points (feature point displacement amount) in the phoneme frame relative to feature points in the reference frame. Then, the authentication device generates a single feature vector composed of a plurality of feature point displacements that have been obtained with respect to a plurality of phoneme frames, and compares the feature vector with a pre-registered template vector. Subsequently, the authentication device obtains a similarity between the feature vector and the template vector through the comparison, and determines whether the user is the person in question based on the similarity.

PTL 3 discloses a finger vein authentication system of a challenge-response type. In the authentication system according to PTL 3, a finger used for personal authentication is specified at random, and a site (site to be verified) of the finger used for personal authentication is determined at random.

PTL 4 discloses verifying the existence of a user in addition to verifying whether the user is a person in question (personal authentication). The authentication system disclosed in PTL 4 performs a process of identity verification of a user (personal authentication) by using a password, biometric information, passport, driver's license, integrated circuit (IC) card, or the like. Then, the authentication system obtains information about the user position and time at which the process of identity verification was performed, and stores the obtained information. In addition, the authentication system compares the user position and time at which the identity was verified with the user position and time at which the immediately previous (i.e., the last) identity verification had been performed. The authentication system then determines whether the distance and duration of movement of the user are appropriate, and verifies the existence of the user by using the determination result.

CITATION LIST

Patent Literature

[PTL 1] Japanese Unexamined Patent Application Publication No. H9(1997)-179583
[PTL 2] Japanese Unexamined Patent Application Publication No. 2006-268563
[PTL 3] Japanese Unexamined Patent Application Publication No. 2009-031986
[PTL 4] Japanese Unexamined Patent Application Publication No. 2008-269556

SUMMARY OF INVENTION

Technical Problem

In general, CAPTCHA-based verification of the existence uses a challenge image. The challenge image is an image of letters with distortion or noise added such that the letters are difficult to recognize for a computer running in accordance with a computer program (decipher program) for deciphering random character string. For example, in a process of verifying the existence, the challenge image is presented to a user, and then determination is made as to whether the user has succeeded in correctly reading the challenge image. If the user has correctly read the image, the existence of the user is verified. However, to cope with advanced decipher program, the challenge images in the CAPTCHA are complicated to the extent even human beings may not easily determine the images any more. Thus, there is a growing need for a technique for verifying the existence of a user based on a new reference different from the existing CAPTCHA.

From a viewpoint of providing safe and highly reliable online service, the CAPTCHA-based verification of the existence is not enough. In addition to the CAPTCHA, either one or both of identity verification and uniqueness verification is/are needed. Uniqueness, as used in the present specification, means that only a single online account is issued to a single person. In other words, the uniqueness means that online accounts are not issued to a single person redundantly.

The present invention has been designed for the purpose of solving the problems described above. That is, a primary object of the present invention is to provide a technique for improving safety and reliability of services provided by a computer.

Solution to Problem

To achieve the primary object of the present invention, An authentication device of the present invention includes:

a transmission unit that transmits a challenge to a terminal device on which the challenge is presented to a user of being authenticated, the challenge being information serving as a basis on which the user inputs information to be used in an authentication process; and a determination unit that performs the authentication process to determine whether a response is correct or wrong, the response being information which is inputted by the user to the terminal device based on the challenge, wherein the transmission unit includes a function to transmit, to the terminal device, a plurality of challenges to the user, the challenges being different from one another, and at least one of the challenges is information requesting the user to make the response that includes biometric information on the user; and wherein the determination unit further includes a function to determine whether time information regarding the challenge and the response to the challenge satisfies a condition regarding the response.

An authentication system of the present invention includes:

the authentication device of the present invention; and the terminal device that presents to the user of being authenticated the plurality of challenges transmitted from the authentication device, and accepts responses made by the user to the challenges and transmits the responses to the authentication device.

An authentication method of the present invention includes:

when transmitting a challenge to a terminal device that presents the challenge to a user of being authenticated, the challenge being information serving as a basis on which the user inputs information to be used for an authentication process, transmitting by a computer to the terminal device a plurality of challenges which are different from one another and include the challenge requesting the user to make a response which includes biometric information regarding the user;

determining by a computer whether the response inputted by the user to the terminal device based on the challenge is correct or wrong against the challenge; and determining by a computer whether time information regarding the challenge and the response to the challenge satisfies a condition regarding the response.

A computer recording medium of the present invention storing a procedure for causing a computer to execute the processes of:

when transmitting a challenge to a terminal device that presents the challenge to a user of being authenticated, the challenge being information serving as a basis on which the user inputs information to be used for an authentication process, transmitting to the terminal device a plurality of challenges which are different from one another and include the challenge requesting the user to make a response which includes biometric information regarding the user;

determining whether the response inputted by the user to the terminal device based on the challenge is correct or wrong against the challenge; and determining whether time information regarding the challenge and the response to the challenge satisfies a condition regarding the response.

The above-mentioned primary object of the present invention is also achieved by an authentication method of the present invention according to the authentication device of the present invention. In addition, the above-mentioned primary object of the present invention is also achieved by a computer program and a program storage medium according to the authentication device of the present invention and authentication method of the present invention.

Advantageous Effects of Invention

The present invention allows of improving safety and reliability of services provided by a computer.

BRIEF DESCRIPTION OF DRAWINGS

FIG. 6 illustrates specific examples of challenges.

FIG. 7 illustrates other specific examples of challenges.

FIG. 8 illustrates further other specific examples of challenges.

FIG. 9 illustrates still further other specific examples of challenges.

FIG. 10 illustrates specific examples of temporal relations between challenges and their responses according to the second example embodiment.

DESCRIPTION OF EMBODIMENTS

Example embodiments of the present invention will be described below with reference to the drawings.

First Example Embodiment

Figure 1:
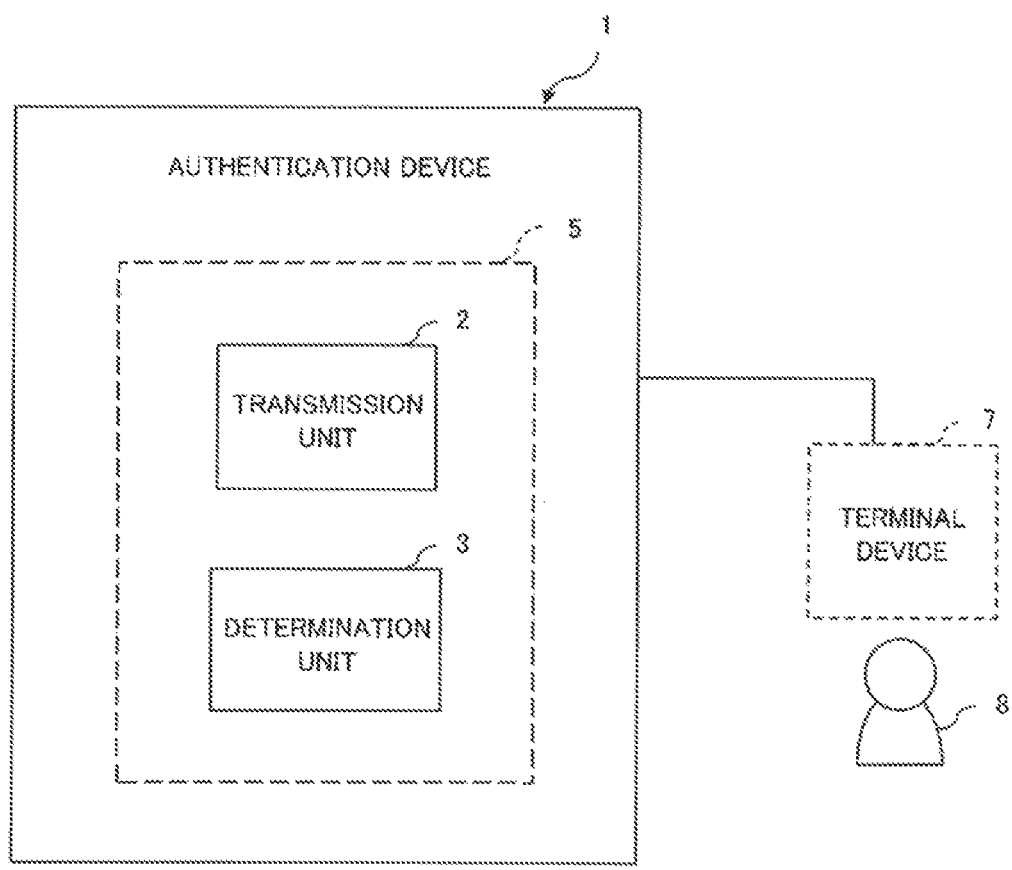
FIG. 1 is a block diagram schematically illustrating a configuration of an authentication device according to a first example embodiment of the present invention.

FIG. 1 is a block diagram schematically illustrating a configuration of an authentication device according to a first example embodiment of the present invention. The authentication device 1 is coupled to a terminal device 7. The terminal device 7 includes an input unit (not illustrated) in which information is input and an output unit (not illustrated) which outputs information. Examples of the input unit may include a keyboard and a touch panel. Examples of the output unit may include a speaker producing a sound and a display showing images.

The authentication device 1 includes a transmission unit 2 and a determination unit 3. The transmission unit 2 and determination unit 3 are functional units implemented by, for example, execution of a computer program by a control device 5 that includes a processor (not illustrated).

The transmission unit 2 has a function to transmit a challenge to the terminal device 7. The challenge means information (e.g., image data or voice data) serving as a basis on which a user 8 of being authenticated inputs information used for an authentication process. For example, when the challenge is presented by the output unit in the terminal device 7, the user 8 inputs information (response) based on the challenge into the terminal device 7 using the input unit in the terminal device 7.

In the first example embodiment, the transmission unit 2 transmits a plurality of challenges different from one another toward the user 8 of being authenticated. At least of one of the plurality of challenges is information requesting the user 8 to give the response that includes biometric information regarding the user 8.

The determination unit 3 has a function to determine, upon receipt from the terminal device 7 the response inputted by the user 8 to the terminal device 7, whether the response to the challenge is correct or wrong, which constitutes the authentication process. By way of example, suppose that the challenge is image data showing a plurality of numeric characters (e.g., distorted numeric characters). Then, the user 8 enters numbers read from the image (challenge) into the terminal device 7. The entered numbers, which constitute the response, are transmitted from the terminal device 7 to the authentication device 1. The determination unit 3 determines whether the numbers entered as responses match with the numeric characters shown in the image data presented as a challenge. If the numbers match with the numeric characters, the determination unit 3 determines that the response is correct. In this case, the authentication device 1 can verify the existence of the user 8 (the response has been inputted by a real human and not by a computer (computer program)).

If, for example, the challenge is the information requesting the user 8 to give the response that includes biometric information regarding the user 8, the determination unit 3 compares the response, i.e., biometric information received from the terminal device 7 with the pre-registered biometric information regarding the user 8. In this case, if the biometric information (response) received matches with the pre-registered biometric information, the determination unit 3 determines that the user 8 is the pre-registered user (can verify the identity of the user).

In addition, as the authentication process, the determination unit 3 has a function to make the determination as to whether time information regarding the challenge transmitted by the transmission unit 2 and the response received from the terminal device 7 satisfies a condition regarding the response.

The condition is, for example, a condition for the existence to enable supposing that the response is given by a human being. That is, depending on a state of information included in the challenge, the information may be easily interpreted by a human being through the challenge, but may be difficult for a computer to decipher. In such cases, it is expected that a difference is caused in the length of time from presentation of the challenge to input of the response, depending on a case where the user 8 is human and a case where the user 8 is a computer. The determination unit 3 can verify the existence of the user 8 by using such temporal difference.

The authentication device 1 according to the first example embodiment performs the authentication process on the user 8 with a plurality of challenges, thereby enhancing reliability of the authentication. In addition to the function to determine whether the response to the challenge is correct or wrong, the authentication device 1 has, for example, the function to verify the existence of the user 8 by using time information regarding the challenge and the response. Thus, for example, the authentication device 1 can avoid a situation where image data including distortion or noise which may not easily determined by a human has to be employed as the challenge.

In addition, with at least one of the challenges, the authentication device 1 requests the user 8 to give the response that includes biometric information regarding the user 8. Thus, the authentication device 1 can perform verification of the identity by using the biometric information included in the response. In other words, the authentication device 1 according to the first example embodiment can perform a so-called challenge-response test to verify not only the existence of the user 8 but also the identity of the user 8, thereby improving reliability of authentication. Consequently, when adopted as an authentication device for a service provided by a computer, the authentication device 1 according to the first example embodiment can improve safety and reliability of the service.

Second Example Embodiment

A second example embodiment of the present invention will be described below.

Figure 2:
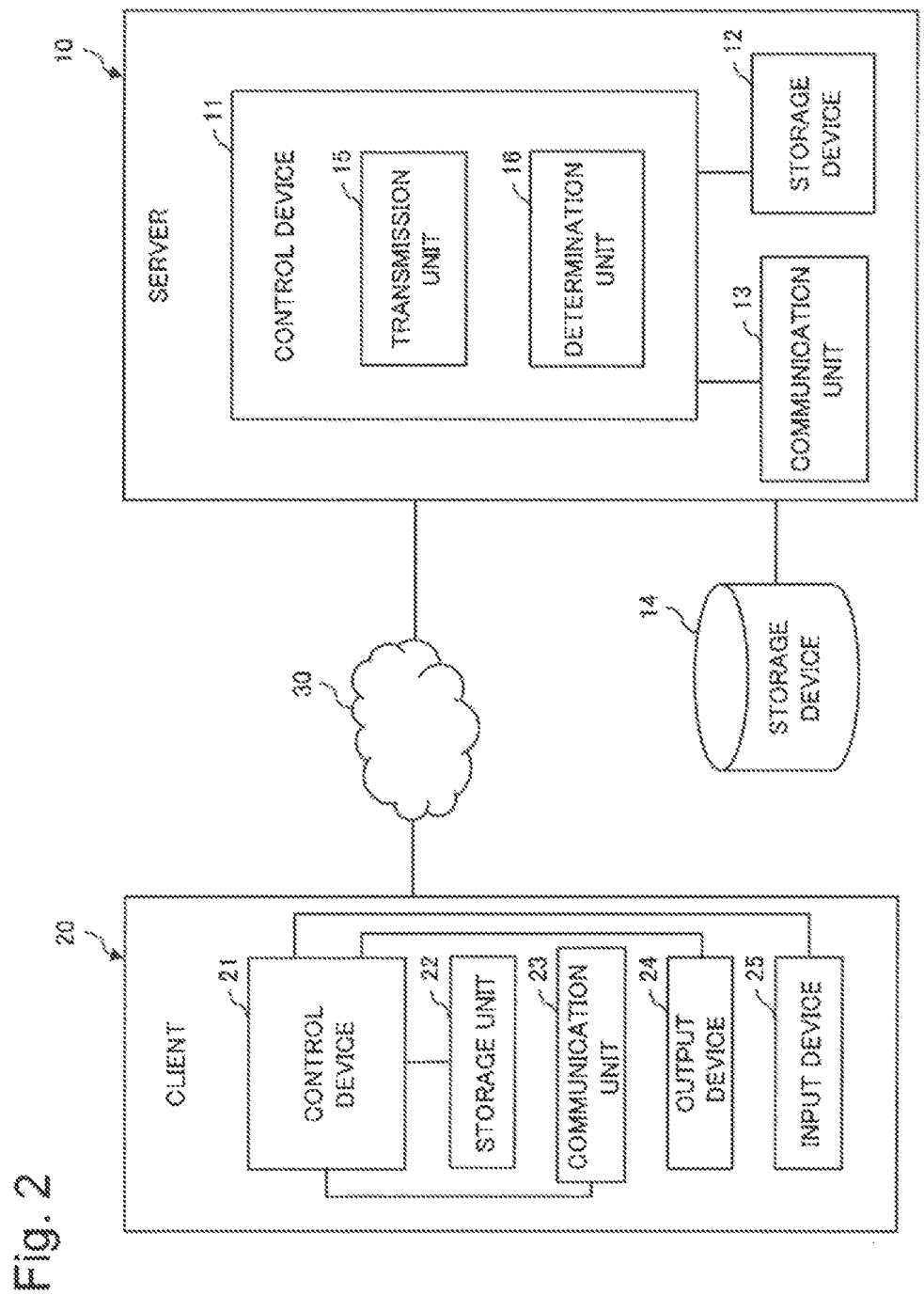
FIG. 2 is a block diagram schematically illustrating a configuration of an online service system which is an authentication system according to a second example embodiment of the present invention.

FIG. 2 is a block diagram illustrating an example configuration of an online service system, which is a computer system including an authentication device according to the second example embodiment. The online service system of the second example embodiment includes a server 10. The server 10, which can be coupled to a client 20, i.e., a terminal device, via an information communication network 30, has a function to provide an online service to a user that uses the client 20. In addition, the server 10 has a function to serve as an authentication device that determines whether the online service can be provided. In other words, the server 10 performs, as the authentication process, identity verification to determine whether the user of the client 20 is permitted to receive the online service. Additionally, the server 10 verifies the existence of the user. Moreover, the server 10 manages accounts for the online service. Additionally, the server 10 may verify the uniqueness of the user (i.e., verify that a plurality of accounts are not issued to the same user).

The server 10 may be a single computer device, or may be configured by a plurality of communicatively coupled computer devices.

In the second example embodiment, the server 10 includes a control device 11, a storage device 12, and a communication unit 13.

The communication unit 13 has a function to enable communications with other communication devices via the information communication network 30. For example, the communication unit 13 includes a network interface card (NIC) compliant with the IEEE 802.3 series and has a function to control communications through the card. The communication unit 13 may include a communication protocol stack (e.g., Transmission Control Protocol (TCP)/Internet Protocol (IP) and User Datagram Protocol (UDP)/IP protocol stack), and may have a function to control communications based on the stack.

The storage device 12 is a device (non-transitory computer readable medium) that can store computer programs and various types of data. For example, the storage device 12 is composed of a combination of a volatile memory and a non-volatile memory. Examples of volatile memory may include static random access memory (SRAM) and dynamic RAM (DRAM). Examples of the non-volatile memory may include a mask read only memory (MROM), a programmable ROM (PROM), and a flash memory. The server 10 may also include, as the storage device 12, a device having a magnetic recording medium (e.g., a flexible disk, magnetic tape, or hard disk drive) or a magneto-optic recording medium (e.g., a magneto-optical disk). In addition, the storage device 12 may be disposed physically apart from the control device 11.

In the second example embodiment, the storage device 12 stores a transmission processing program and a determination processing program. The transmission processing program represents a procedure for transmitting the challenge to be used for the challenge-response test. As described in the first example embodiment, the challenge is information (e.g., image data or voice data) serving as the basis on which the user to be authenticated inputs the information used for the authentication process. The determination processing program represents a procedure for performing a authentication process based on the information (response) inputted by the user based on the challenge.

In the second example embodiment, the server 10 is coupled to the storage device 14. The storage device 14 stores information to be used for the authentication process. For example, the storage device 14 stores the biometric information regarding the users who are permitted to use online services that can be provided by the server 10. The biometric information stored in the storage device 14 may be defined as appropriate depending on types of authentication processes, and specific examples of the biometric information may include image data or feature point data representing a face, voice print, fingerprint, vein pattern, iris pattern, or the like. The server 10 obtains such biometric information through the use of the client 20 and the information communication network 30 and stores the biometric information to the storage device 14, by the server 10 operating in accordance with a procedure for issuing a new online account (procedure for registering a user). The server 10 may update the biometric information stored in the storage device 14 periodically or non-periodically. In addition, when biometric information has been obtained from a user through the authentication process, the server 10 may update the biometric information regarding the user stored in the storage device 14 by using the obtained biometric information.

The control device 11 is configured with, for example, a processor such as a central processing unit (CPU). The control device 11 can have various functions by reading and executing the software (computer programs) stored in the storage device 12. In the second example embodiment, the control device 11 has a function to conduct the challenge-response test. That is, the control device 11 includes a transmission unit 15 and a determination unit 16 as functional units.

The transmission unit 15 has a function to transmit to the client 20 the plurality of challenges to be presented to the user of being authenticated. The challenges are different from one another. At least of one of these challenges is the information requesting the user to give the response that includes the biometric information.

The determination unit 16 has a function to determine, upon receipt of the response inputted by the user into the client 20 based on the challenge, whether the response is correct or wrong. In addition, the determination unit 16 has a function to determine whether a response time needed for the response satisfies a condition for the existence, based on the information regarding the starting time of transmission by the transmission unit 15 and on the information regarding the starting time of receiving the response. The starting time of transmission refers to the time when the transmission unit 15 transmits the challenge, while the starting time of reception refers to the time when the response to the challenge is received from the client 20.

Specific examples of operation of the transmission unit 15 and the determination unit 16 are described later.

The following describes the client 20. The client 20 is a terminal device operated by the user and communicates with the server 10 in a wired or wireless manner via the information communication network (e.g., Internet) 30. The client 20 may be, for example, a personal computer, tablet, or smart phone.

The client 20 includes a control device 21, a storage unit 22, a communication unit 23, an output device 24, and an input device 25.

The storage unit 22 is configured by, for example, a combination of volatile memory and non-volatile memory. The storage unit 22 stores the software (computer program) representing an operation procedure to be conducted by the control device 21.

The communication unit 23 has a function to enable communications with other communication devices (e.g., server 10) via the information communication network 30. The communication unit 23 includes, for example, a network interface card (NIC) compliant with the IEEE 802.3 series. The communication unit 23 also includes a communication protocol stack (e.g., Transmission Control Protocol (TCP)/Internet Protocol (IP) and User Datagram Protocol (UDP)/IP protocol stack). Additionally, the communication unit 23 may have a function to enable wireless communication. For example, the communication unit 23 may enable wireless communications based on a cellular transceiver communication standard such as Wideband Code Division Multiple Access (W-CDMA)/Long-Term Evolution (LTE). The communication unit 23 may also enable wireless communication based on a communication standard for a Wi-Fi® transceiver such as IEEE 802.11 a/b/g/n, or for a Bluetooth® transceiver.

The output device 24 is a device that sends (outputs) information in the mode where a human being can perceive with the sense of vision, hearing, smelling, skin (sense of touch, pain, or temperature), or a combination thereof. Specific examples of the output device 24 include a display device displaying images and a speaker outputting sounds. The client 20 includes a plurality of types of output devices 24.

The input device 25 is a device that accepts information from the user. Specific examples of the input device 25 include an operation button, touch panel, mouse, keyboard, camera, and microphone. The client 20 includes a plurality of types of input devices 25.

The control device 21 includes a processor such as a CPU, and can include various functions by reading and executing the software (computer program) from the storage unit 22. For example, the control device 21 provides an environment (e.g., web browser) that allows use of an online service provided by the server 10.

Figure 3:
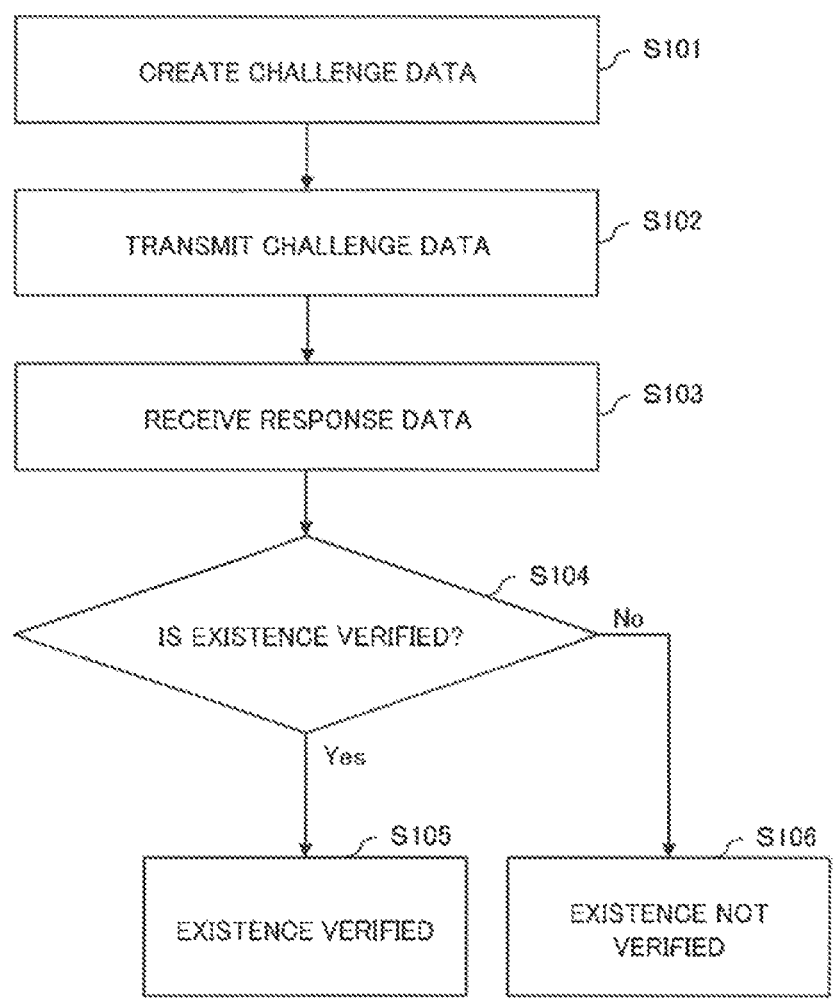
FIG. 3 is a flow chart illustrating example operation of the authentication device according to the second example embodiment.

FIG. 3 is a flowchart illustrating example operations of the server 10. The example operation described here is for the server 10 conducting the challenge-response test as the authentication process. The server 10 may conduct the challenge-response test at a time, for example, when the new online account is issued to the user or when the request for issuing the online account is received from the client 20. In addition, the server 10 may conduct the challenge-response test at a time, when the registered user starts using the online service or when the request for accessing the online service is received from the client 20. Thus, the server 10 can conduct the challenge-response test at any of a plurality of timings and the server 10 conducts the challenge-response test at an appropriate timing by taking into consideration the content and other factors of the service to be provided.

For example, the control device 11 in the server 10 creates challenge data for the user of being authenticated at a time when the challenge-response test is conducted (Step S101). The challenge data includes the plurality of challenges different from one another, and further includes program data for controlling the control device 21 in the client 20 such that these challenges are continuously outputted in sequence from the output device 24 in the client 20.

The control device 11 (transmission unit 15) in the server 10 transmits the generated challenge data to the client 20 through the communication unit 13 (Step S102).

Later, upon receipt of data that includes responses to the transmitted challenges (Step S103), the server 10 analyzes the received data to extract the information necessary for the authentication process. The operations in Step S102 and Step S103 may be performed in parallel in terms of time. For example, the server 10 may receive response data from the client 20 while transmitting the challenge data that includes a video stream or an audio stream to be played by streaming on the client 20. Response data may also include the video stream or the audio steam.

Then, based on the extracted information, the control device 11 (the determination unit 16) in the server 10 determines whether the response made by the user is correct (i.e., whether it is appropriate as the response to the challenge). In addition, the server 10 (the determination unit 16) verifies the existence of the user by using time information regarding the challenge and the response. In this step, the response time or input duration, for example, is used as the time information.

The response time may be, for example, a time period from when the output device 24 outputs the challenge to when the input device 25 inputs the response in the client 20. The response time can be obtained by calculating the difference between the starting time of outputting the challenge in the client 20 and the starting time of inputting its correct response in the client 20. Alternatively, as the response time, a time period from transmission of the challenge by the transmission unit 15 in the server 10 to reception of its response by the server 10 may be used, since the time period is approximately proportional to the response time. In other words, the difference between the starting time of transmission of a challenge from the server 10 and the starting time of reception of its response by the server 10 may be used as the response time.

The input duration for the response refers to a time period when the user is inputting the response to the challenge. In other words, the challenge may be command information instructing the user to perform a specified action (e.g., change face direction, change facial expression, or give an utterance). In such cases, the response is performing the action by the user in accordance with the instruction given by the challenge, and the input duration is the time period (time) when the user is performing the action, i.e., giving the response. In the case where information instructing the user to perform an action is the challenge, a device like a camera or microphone for inputting an action, namely a response to the challenge, is activated in the client 20.

The server 10 determines whether the response time or the input duration satisfies the predetermined condition for effectiveness and determines whether the time information is appropriate. The condition for effectiveness is a condition to expect that the response has been given by a human being.

Then, the server 10 determines whether the existence of the user can be verified based on the determination results as to whether the response is correct or wrong and whether the time information is appropriate (Step S104). If the received response is correct as the response to the challenge and the time information regarding the challenge and its response is appropriate, the control device 11 (the determination unit 16) determines that the existence of the user is verified (Step S105).

On the other hand, if the received response is not correct as the response to the challenge or the time information regarding the response is not appropriate, the control device 11 (the determination unit 16) determines that the existence of the user may not be verified (Step S106). In other words, the control device 11 (the determination unit 16) determines that the user may not be a human being.

In the second example embodiment, the server 10 serving as the authentication device conducts the challenge-response test by asking the user to give the plurality of responses to the plurality of challenges that are continuously presented in sequence. Then, the server 10 verifies whether the user is a human being (i.e., existence of user) based on the time information regarding the response time, the input duration or the like for the user to give the responses. In other words, the server 10 verifies whether the user is a human being based on whether the response is inputted at the appropriate timing (time period).

The server 10 requests the user to give responses for the challenge-response test such that at least one of the plurality of responses includes the biometric information (e.g., a facial image, voice or the like). That is, the server 10 verifies the existence of the user based on whether the time information, such as the response time or the input duration, regarding the response that includes the biometric information (e.g., the facial image or voice) from the user, is appropriate. Accordingly, the server 10 of the second example embodiment can have an advantage that it is not necessarily need to use a complex challenge image that includes so much distortion or noise that human beings cannot easily recognize the image.

Furthermore, in the second example embodiment, at least one of the plurality of responses includes the biometric information (e.g., the facial image or voice). As the result, the server 10 can obtain the effect as described below. In addition to using the biometric information included in the response for verifying the existence of the user, the server 10 can also use the biometric information for verifying the identity (personal authentication) and the uniqueness of the user. As described above, in order to provide the safe and highly reliable online services, the CAPTCHA-based verification of the existence is not enough, it is preferable to conduct either one or both of the identity verification and the uniqueness verification in addition to the CAPTCHA. The identity verification (personal authentication) means verifying whether the user accessing the online service is the person who is permitted to use the online service. The uniqueness verification means verifying that the plurality of online accounts are not issued to a single person redundantly. In the second example embodiment, the response used for verifying the existence of the user includes the biometric information regarding the user, and thus the server 10 can use the biometric information for verifying the identity and the uniqueness of the user as well. In other words, the server 10 can use a single response made by the user for the plurality of authentication processes, and thereby allows for user authentication through a plurality of authentication processes while avoiding an increase in the burden imposed on the user for inputting responses. As a result, the server 10 can improve the safety and reliability of online services.

Figure 4:
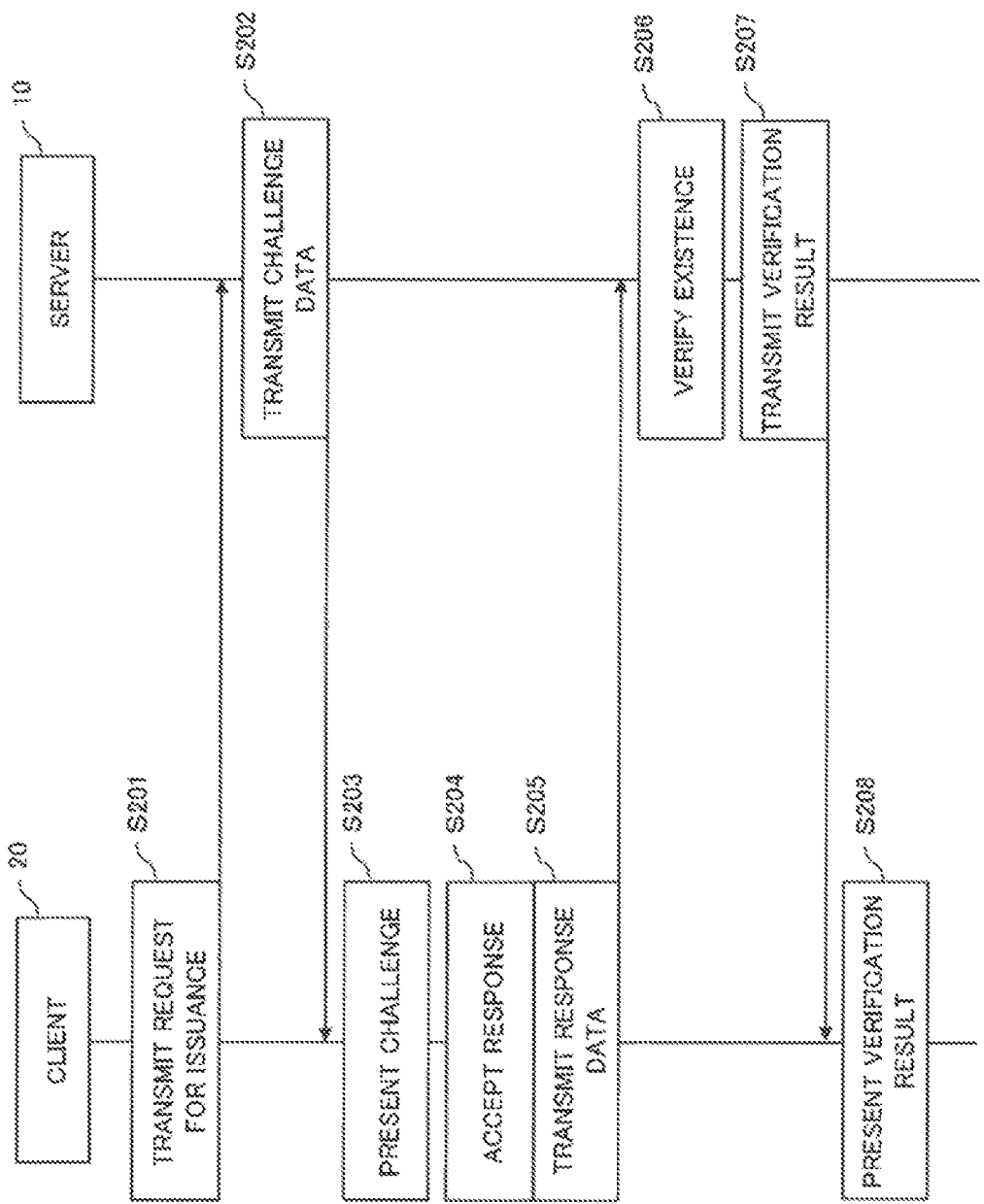
FIG. 4 is a sequence diagram illustrating an example procedure for issuing an account, the procedure including an authentication process according to the second example embodiment.

The following describes specific examples of processes related to authentication for the online service system according to the second example embodiment. FIG. 4 is a sequence diagram illustrating a flow of processes related to the authentication for the online service system. The process flow illustrated in FIG. 4 is related to the process of issuing the online account. In the middle of the process of issuing the online account, the authentication process according to the second example embodiment is performed.

For example, when the user instructs the client 20 to issue the account using the input device 25, the client 20 transmits a request for issuing the account (online account) to the server 10 (Step S201). The request for issuing the online account is, in other words, an application for user registration needed for using the online service.

Upon receipt of the request for issuance, the server 10 performs verification of the existence (the challenge-response test) to verify whether the user operating the client 20 is a human being.

That is, the server 10 creates the challenge data and transmits the challenge data to the client 20 (Step S202). Upon receipt of the challenge data, based on the challenge data, the client 20 continuously presents the plurality of challenges in sequence to the user using the output device 24 (Step S203). When the user inputs the responses to the challenges into the client 20 using the input device 25, the client 20 accepts the responses (Step S204). Then, the client 20 generates the response data that includes responses to the individual challenges and transmits the response data to the server 10 (Step S205).

Upon receipt of the response data, the server 10 verifies the existence using the received responses (Step S206). That is, the server 10 verifies the existence of the user by using the determination result as to whether the responses to the challenges are correct or wrong and the time information regarding the responses.

In addition, the server 10 checks the biometric information included in the response against the biometric information registered in the storage device 14. For example, the server 10 calculates a similarity (matching probability) between the biometric information included in the response and the registered biometric information to determine whether the similarity is equal to or greater than a threshold. When the server 10 determines that the storage device 14 does not register the biometric information which matches with the biometric information included in the response (i.e., biometric information whose similarity is equal to or greater than the threshold), the server 10 determines that the user requesting for the account is not registered. The server 10 can verify the uniqueness of the user, and thus issues the account to the user.

On the other hand, if the biometric information included in the response matches with the registered biometric information (i.e., if the biometric information whose similarity is equal to or greater than the threshold is registered in the storage device 14), the server 10 refuses to issue the account. That is, the server 10 determines that it is highly probable that the user requesting for issuing the account is the same person as the registered users, and refuses to issue the account in order to prevent issuing the plurality of accounts to the same user.

Then, the server 10 transmits to the client 20 the determination result as to whether an account can be issued based on the result of the authentication process (Step S207). Upon receipt of the determination result, the client 20 presents the determination result to the user using the output device 24 (Step S208).

If the existence of the user is not verified as the result of the authentication process, the server 10 does not need to perform the process of verifying the uniqueness of the user. Alternatively, the server 10 may perform the process of verifying the existence of the user and the process of verifying the uniqueness of the user in parallel in terms of time.

Figure 5:
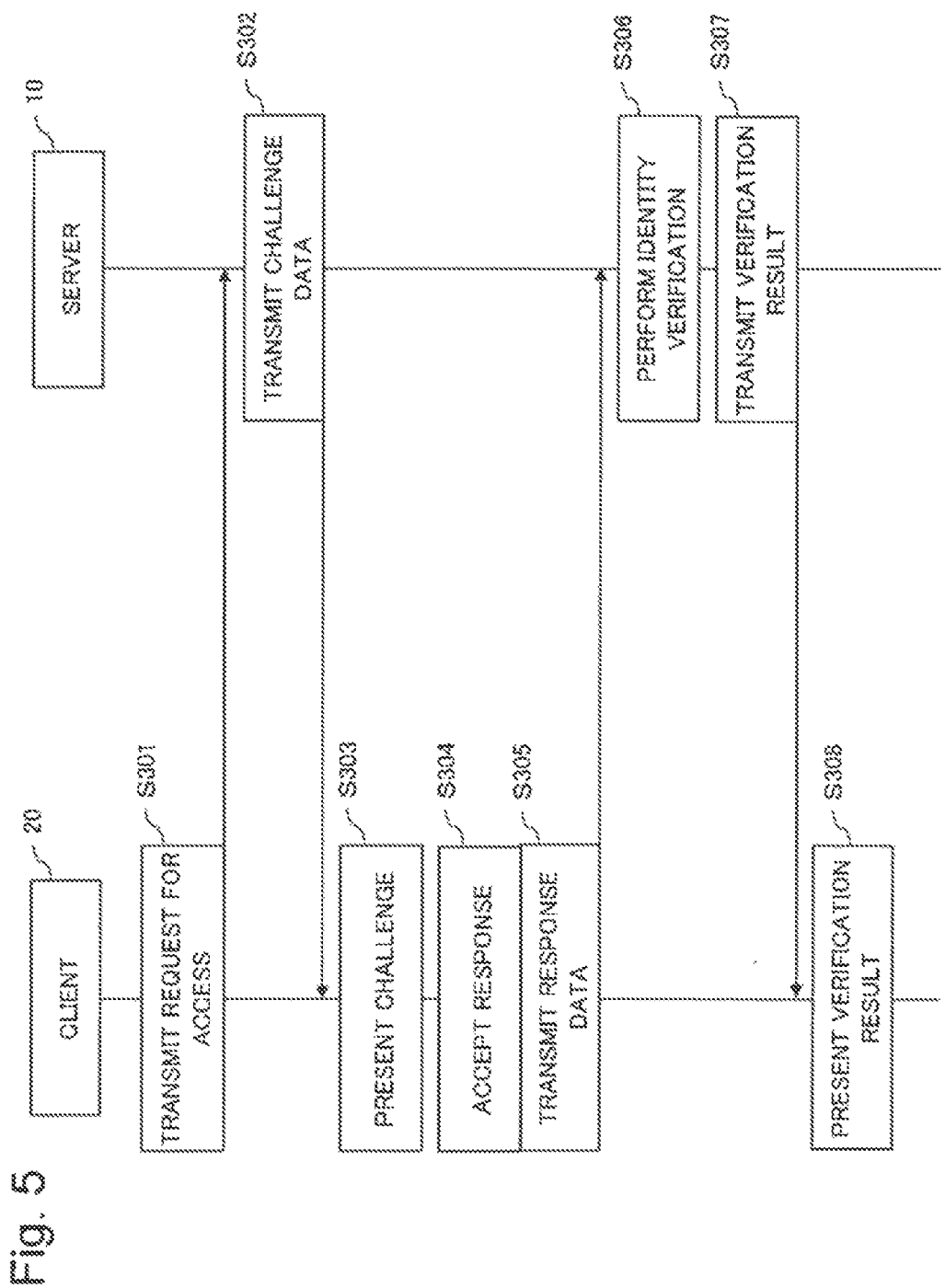
FIG. 5 is a sequence diagram illustrating an example procedure for using an online service, the procedure including the authentication process according to the second example embodiment.

The following describes another process flow in the online service system. The following description about the process flow in the online service system assumes that the authentication process of the second example embodiment is performed when the user starts using the online service. FIG. 5 is a sequence diagram illustrating the process flow.

For example, when the user requests the client 20 by using the input device 25 to access the server 10 that provides the online service, the client 20 transmits an access request to the server 10 (Step S301). In this step, the client 20 transmits, as the access request, the user identification (ID) (account ID) assigned to the user.

Upon receipt of the access request, the server 10 conducts the challenge-response test, which serves as the process of verifying the identity to determine whether the user operating the client 20 is permitted to provide the service.

That is, the server 10 creates the challenge data and transmits the challenge data to the client 20 (Step S302). Upon receipt of the challenge data, the client 20 continuously presents the plurality of challenges in sequence to the user based on the challenge data by using the output device 24 (Step S303). When the user inputs responses to the challenges into the client 20 using the input device 25, the client 20 accepts the responses (Step S304). Then, the client 20 generates response data that includes responses to the individual challenges and transmits the response data to the server 10 (Step S305).

Upon receipt of the response data, the server 10 verifies the existence of the user using the received responses as described above. In addition, the server 10 performs verification of the identity of the user (the personal authentication) using the user's biometric information included in a response (Step S306). That is, the server 10 reads from the storage device 14 the biometric information associated with a user ID identical to the user ID that has been received in the form of the access request. Then, the server 10 checks the biometric information included in the response received from the client 20 against the biometric information that has been read. Through the checking, the server 10 calculates, for example, the similarity (matching probability) between the biometric information included in the response and the registered biometric information.

If the biometric information included in the response matches with the registered biometric information at a high probability (i.e., if the similarity (matching probability) is equal to or greater than the threshold), the server 10 determines that it is highly probable that the user sending a request for access is an authorized user. The server 10 then permits an access with the client 20 operated by the user.

On the other hand, if the biometric information included in the response matches with the registered biometric information at a low probability (i.e., if the similarity (matching probability) is less than the threshold), the server 10 determines that the user sending a request for access may not be an authorized user. The server 10 then refuses the access with the client 20 operated by the user.

Next, the server 10 transmits to the client 20 the determination result as to whether the access based on the result of verification of the identity is allowable (in other words, provision of service) (Step S307). Upon receipt of the determination result, the client 20 presents the determination result to the user using the output device 24 (Step S308).

If the existence of the user is not verified, the server 10 does not need to perform the process of verifying the identity of the user. Alternatively, the server 10 may perform the process of verifying the existence of the user and the process of verifying the identity of the user in parallel in terms of time.

In each process flows for the online system described with reference to FIGS. 4 and 5, the challenge-response test conducted to verify the existence of the user provides biometric information, which is used for verifying not only the existence but also the identity or the uniqueness. This allows the server (authentication device) 10 to perform the plurality of processes for authentication while avoiding an increase in the burden imposed on the user, thereby enhancing reliability of authentication.

The above has described processes in a system including the authentication process of the second example embodiment, with the example processes of issuing a new online account and starting to use the online service. However, the authentication process of the second example embodiment may be applied to processes other than the ones described above.

The following describes specific examples of challenges used for the challenge-response test, which constitutes the authentication process performed by the server 10 according to the second example embodiment.

For example, the server 10 may provide the client 20 with the plurality of challenges in the mode of the video stream or the audio stream to be played by streaming on the client 20. The video stream or the audio stream continuously presents the plurality of challenges in sequence. The term "streaming" or "played by streaming" as used herein means the technology for playing back a data file while downloading the data file. That is, the term "streaming" or "played by streaming" as used in the present specification includes not only pure streaming where the video stream or the audio stream is not cached but also progressive download where the streams are cached. Progressive download may also be called progressive streaming or on-demand streaming.

The number of challenges included in a single video stream or a single audio stream and the length of time for playing each challenge are appropriately set by taking into consideration factors such as accuracy of authentication, a standard response time taken by users, and burdens imposed on users. For example, the number of challenges may be about 3, and the length of time for playing the whole video stream or audio stream may be about 5 to 10 seconds.

The server 10 creates the single video stream or the single audio stream by randomly selecting some challenges from the plurality of challenges prepared in advance (e.g., images, voices or the like) and linking the selected challenges.

A computer may not easily interpret each of the plurality of challenges that are continuously provided in sequence in the mode of the video stream or the audio stream. Thus, by using the plurality of challenges in the mode of the video stream or the audio stream, the server 10 can improve the accuracy of determination (verification) as to the existence of the user. Specifically, the plurality of challenges are provided in the mode of the video stream or the audio stream, and are played in series immediately after the challenges are received by the client 20. The user is prompted to make instantaneous (real-time) responses to these challenges. On the other hand, a computer has difficulty in instantaneously interpreting the challenges provided in sequence, and thus fails to give (return) correct responses to the server 10. As a result, even when a computer tries to impersonate a human being, the server 10 can deny the existence of the user by performing the process of verifying the existence that involves the plurality of challenges in the mode of the video stream or the audio stream.

Optionally, the server 10 may create the challenge data which includes data for controlling the output device 24 in the client 20 so as to present the individual challenges to the user for periods of time (hereinafter also referred to as output durations) different from one another. In addition, the server 10 may randomly determine output durations of the individual challenges. For example, the server 10 differentiates, for each challenge, periods of time for displaying or periods of time for outputting of each challenges (images or voices) included in the video stream or the audio stream. This makes it difficult for a computer to predict timing when the challenge is switched to another challenge. Thus, interpretation of challenges becomes more difficult. As a result, the server 10 can further improve the accuracy of determination (verification) of the existence of the user.

Although presenting the plurality of challenges in the mode of the video stream or the audio stream to the user can improve the accuracy of determination as to the existence of the user, the plurality of challenges do not need to be presented in the mode of the video stream or the audio stream.

For example, the server 10 may create individual challenges in the form of independent data files (e.g., still image files or sound files). In this case, the server 10 creates the challenge data which includes control data for controlling the output device 24 in the client 20 such that display or output of still images or sounds representing challenges is updated at a predetermined timing. Additionally, the server 10 may adjust the output durations for the individual challenges such that the display or the output of still images or sounds representing the challenges is updated at a non-periodical timing. Furthermore, the server 10 may adjust the output durations for the individual challenges such that the output durations of displaying or outputting of still images or sounds representing the challenges are different from one another.

FIGS. 6 to 9 illustrate specific examples of challenges. Any challenges illustrated in FIGS. 6 to 9 prompts a user to input a response which includes the biometric information regarding the user. For example, the server 10 randomly selects from these challenges the plurality of challenges to be presented to the user. The server 10 may create the video stream or the audio stream by linking together the plurality of challenges which have been randomly selected.

FIG. 6 illustrates specific examples of challenges in the case where a direction of face is used for the user authentication. In the examples in FIG. 6, four different ways of challenges (image A, image B, image C, and voice) are classified for each type and the same type of challenges are associated with one another. Each of the types is given a "code" serving as an identifier and a "type" serving as a name. For example, among the four challenges of a type in which the code is "FD02" and the type is "Leftward", the image A is an icon image representing a flipped mirror image of the face oriented to the left. The image B is an image showing a character string: "Face to the left". The image C is an arrow icon image instructing the user to face the left. The voice is voice data instructing the user to face the left.

FIG. 7 illustrates specific examples of challenges in the case where facial expressions are used for the user authentication. As with FIG. 6, FIG. 7 illustrates that four different ways of challenges (image A, image B, image C, and voice) are classified for each type and the same type of challenges are associated. Each of the types is given a "code" serving as an identifier and a "type" serving as a name. For example, among the four challenges of a type in which the code is "FE02" and the type is "Happy", the image A is an icon image representing a happy face. The image B is an image showing a character string: "Give a happy face". The image C is an icon image showing a kanji character representing happiness. The voice is voice data instructing the user to give a happy face.

FIG. 8 illustrates specific examples of challenges in the case where pronunciation of numbers is used for the user authentication. As with FIGS. 6 and 7, FIG. 8 illustrates that four different ways of challenges (image A, image B, image C, and image D) are classified for each type and the same type of challenges are associated. Each of the types is given a "code" serving as an identifier and a "type" serving as a name. For example, among the four challenges of a type in which the code is "VN02" and the type is "2 pronunciations", the image A is an image showing an Arabic number "2" with a character string: "Pronounce this number". The image B is an image showing two dots with a character string: "Pronounce the number of dots". The image C is an image showing two lines with a character string: "Pronounce the number of lines". The image D is an image showing a mathematical expression whose answer is 2 with a character string: "Pronounce the answer".

FIG. 9 illustrates specific examples of challenges in the case where pronunciation of vowels is used for the user authentication. As with FIGS. 6 to 8, FIG. 9 illustrates that four different ways of challenges (image A, image B, image C, and image D) are classified for each type, and the same type of challenges are associated. Each of the types is given a "code" serving as an identifier and a "type" serving as a name. For example, among the four challenges of a type in which the code is "VV_A" and the type is "Pronunciation of a", the image A is an image showing a lower-case alphabetical character "a" with a character string: "Pronounce".

The image B is an image showing an upper-case alphabetic character "A" with a character string: "Pronounce". The image C is an image showing a Katakana character "ア" with a character string: "Pronounce". The image D is an image showing a Hiragana character "あ" with a character string: "Pronounce".

For example, when the challenge related to the direction of face as illustrated in FIG. 6 is used, the server 10 determines whether the direction of face extracted from, for example, an image data that is included in the response to the challenge is in accordance with the instruction given by the challenge. If the challenge additionally includes an instruction about a period of time (input duration) when the user is following the instruction to change the direction of face, the server 10 determines whether the input duration detected from the response is consistent with a period of time compliant with the instruction (e.g., instruction about output duration) given by the challenge.

Further, for example, when a sound as illustrated in FIG. 6 or 7 is used for the user authentication, the server 10 determines whether the sound detected from the response is in accordance with the instruction given by the challenge. In addition, the server 10 determines whether the response time or a sound input duration detected from the response to the challenge is consistent with the period of time in accordance with the instruction (e.g., instruction about output duration) given by the challenge.

FIG. 10 illustrates a specific example of the plurality of challenges and the plurality of responses according to the challenges. In the specific example, the challenges are in the mode of the video stream played by streaming. The video stream composed of challenges includes a period 501 when the facial icon image representing a request for the action of facing upward is displayed on the output device 24 (display) in the client 20. Further, the video stream includes a period 502 when the image of characters representing a request for pronouncing a number is displayed, and at the same time, a sound of, for example, reading the displayed characters is produced, which is further followed by a period 503 when the facial icon image representing a request for the action of facing the left is displayed. That is, the video stream displays three challenges during the periods 501, 502, and 503. Individual lengths of the periods 501, 502, and 503 (i.e., output durations (periods when challenges are played)) are different from one another. Specifically, the length of the period 501 (output duration) is 3 seconds, the length of the period 502 (output duration) is 5 seconds, and the length of the period 503 (output duration) is 2 seconds.

The specific example in FIG. 10 shows that responses to the challenges include the action of facing upward, the action of pronouncing "4", and the action of facing the left, which are performed by the user. These responses are taken by, for example, a camera serving as the input device 25 and transmitted from the client 20 to the server 10 in the mode of the video stream serving as the response data.

The server 10 analyzes the received response data (e.g., the video stream) to identify responses. Then, the server 10 performs the authentication process using the responses.

For example, the server 10 makes the determination, as the authentication process, as to whether the response time (T1) needed for the user to start reacting (facing upward) to the instruction given by the challenge "Face upward" is equal to or less than a predetermined value (e.g., 1.0 second). Additionally, the server 10 may determine whether the time when the user keeps facing upward (input duration (T2)) is consistent with the length according to the output duration (3 seconds) of presenting the challenge (e.g., within a range of 2.0 to 4.0 seconds). Furthermore, the server 10 may determine whether the response time (T3) needed for the user to start reacting (answering) to the instruction given the challenge "Pronounce the answer" is equal to or less than the predetermined value (e.g., 1.0 second). Additionally, the server 10 may determine whether the response time (T4) needed for the user to start reacting (facing the left) to the instruction given by the challenge "Face the left" is equal to or less than the predetermined value (e.g., 1.0 second). Still further, the server 10 may determine whether the length of time when the user keeps facing the left (input duration (T5)) is consistent with the length according to the output duration (2 seconds) of presenting the challenge (e.g., within a range of 1.0 to 3.0 seconds).

Other Example Embodiments

The present invention is not limited to the first and second example embodiments, but may employ various example embodiments. For example, although the second example embodiment describes an example where the authentication device of the present invention is applied to the online service system, the authentication device of the present invention can be applied to systems other than online service systems.

At least a part of the processes among processes handled by the server 10 and client 20 (e.g., pattern matching for detecting the facial image or the predetermined voice from the response data), as described in the second example embodiment, may be performed by using a dedicated hardware piece.

The part or the whole of the above example embodiments can be described as, but is not limited to, the following supplementary notes.

(Supplementary Note 1)

A method for conducting a challenge-response test, the method includes:

transmitting challenge data to an input and output system, the challenge data being used to control the input and output system such that the input and output system continuously outputs a plurality of challenges in sequence;

receiving, through the input and output system, response data representing a plurality of responses to the plurality of challenges by a user; and determining whether at least one of an input start time and an input duration regarding each of the plurality of responses contradicts with at least one of an output start time related to the input start time and an output duration related to the input duration concerning each of the plurality of challenges, in order to verify whether the user is a human being, at least a part of the plurality of responses represents biometric information regarding the user.

(Supplementary Note 2)

In the method according to Supplementary Note 1, at least a part of the plurality of responses represents the biometric information regarding the user, and the method further includes, for one or both of verification of identity of the user and verification of uniqueness of the user, comparing the biometric information with pre-registered biometric information regarding the user or pre-registered biometric information regarding another user.

(Supplementary Note 3)

The method according to Supplementary Note 2, further includes:

receiving a request for accessing an online service or a request for issuing an online account through the input and output system, and, upon receiving, transmitting the challenge data.

(Supplementary Note 4)

The method according to Supplementary Note 3, further includes:

on condition that verification which the user is a human being is successfully performed and that at least one of verification of identity of the user and verification of uniqueness of the user is successfully performed, transmitting to the input and output system a response representing that access to the online service or issuance of the online account is permitted.

(Supplementary Note 5)

In the method according to any one of Supplementary Notes 2 to 4, the challenge data includes first challenge image data or first challenge voice data to instruct to turn a direction of face as one of the plurality of challenges, and the response data includes response image data captured an image of a face in the user.

(Supplementary Note 6)

The method according to Supplementary Note 5 includes determining whether the direction of face in the user and an input duration of continuing the direction of face detected from the response image data contradict with an output duration of an instruction represented in the first challenge image data or the first challenge voice data.

(Supplementary Note 7)

In the method according to any one of Supplementary Notes 2 to 6, the challenge data includes second challenge image data or second challenge voice data to instruct to utter a predetermined sound or word as one of the plurality of challenges, and the response data includes response voice data where a voice uttered by the user is recorded.

(Supplementary Note 8)

The method according to Supplementary Note 7 includes determining whether the voice of the user and an input duration of the voice detected from the response voice data contradict with an output duration of the instruction represented in the second challenge image data or the second challenge voice data.

(Supplementary Note 9)

In the method according to any one of Supplementary Notes 1 to 8, the challenge data includes a video stream or an audio stream which is played by streaming playback in the input and output system and continuously indicates the plurality of challenges in sequence.

(Supplementary Note 10)

In the method according to Supplementary Note 9, the streaming playback includes progressive download.

(Supplementary Note 11)

The method according to any one of Supplementary Notes 1 to 10, further includes generating the challenge data such that each output durations in the plurality of challenges is different from one another.

(Supplementary Note 12)

A computer system includes:

a memory; and at least one processor that is coupled to the memory and is configured to execute the method according to any one of Supplementary Notes 1 to 11.

(Supplementary Note 13)

A program causes a computer to execute the method according to any one of Supplementary Notes 1 to 11.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-126353, filed on Jun. 19, 2014, the disclosure of which is incorporated herein in its entirety by reference.

REFERENCE SIGNS LIST

1 Authentication device
2, 15 Transmission unit
3, 16 Determination unit
7 Terminal device
10 Server
20 Client

The invention claimed is:

1. An authentication device comprising:
a memory configured to store instructions; and
a processor configured to execute the instructions to:
output a first instruction, the first instruction comprising first information and second information, the first information requesting a user to perform a first challenge, and the second information corresponding to a first period of time the user has to perform the first challenge;
output a second instruction, the second instruction comprising third information and fourth information, the third information requesting the user to perform a second challenge, and the fourth information corresponding to a second period of time the user has to perform the second challenge;
output a third instruction, the third instruction comprising fifth information and sixth information, the fifth information requesting the user to perform a third challenge, and the sixth information corresponding to a third period of time the user has to perform the third challenge;
capture first biometrics information of the user in response to the first instruction;
capture second biometrics information of the user in response to the second instruction;
capture third biometrics information of the user in response to the third instruction; and
output a result in a case where the first period of time the user has to perform the first challenge satisfies the second information, the second period of time the user has to perform the second challenge satisfies the fourth information, the third period of time the user has to perform the third challenge satisfies the sixth information, and the response to the first instruction, the response to the second instruction, and the response to the third instruction are correct.

2. The authentication device according to claim 1, wherein the first biometrics information and the third biometrics information are live motion images captured by a camera.

3. The authentication device according to claim 1, wherein
the first instructions indicates an icon image of a face representing the first information, and the third instruction indicates an icon image of a face representing the fifth information.

4. The authentication device according to claim 1, wherein a first facial image of the first biometrics information of the user and a second facial image of the third biometrics information of the user comprise a plurality of frames.

5. The authentication device according to claim 1, wherein the processor is further configured to display a direction corresponding to a movement of a face of the user performed according to the first information or the fifth information using a facial icon image.

6. The authentication device according to claim 1, wherein the first challenge, the second challenge and the third challenge are different operations to be performed by the user.

7. The authentication device according to claim 1, wherein the first instruction, the second instruction and the third instruction are continuously presented to the user.

8. The authentication device according to claim 1, wherein each of a first facial image of the first biometrics information of the user and a second facial image of the third biometrics information of the user is a video.

9. The authentication device according to claim 5, wherein each of the second information and the sixth information is associated with different periods of time.

10. The authentication device according to claim 1, wherein the result does not indicate that the user is a real human when the first period of time the user continuously keeps facing in a first direction after moving the face of the user towards the first direction does not satisfy the second information, when the second period of time the user has to perform the second challenge does not satisfy the fourth information, when the third period of time the user continuously keeps facing in a second direction after moving the face of the user towards the second direction does not satisfy the sixth information, when a movement of the face of the user in a direction represented in a facial image input in the response corresponding to the first instruction, when a movement of the face of the user in a direction represented in a second facial image input in the response corresponding to the third instruction is incorrect, or when the response to the second information is incorrect.

11. The authentication device according to claim 1, wherein the first instruction, the second instruction and the third instruction comprise a request for biometric information on the user.

12. The authentication device according to claim 11, wherein the processor is further configured to determine that the user is a pre-registered user based on the biometric information included in the response.

13. The authentication device according to claim 11, wherein the processor is further configured to determine that the user is a pre-registered user based on the biometric information included in the response when the result does not indicate that the user is a real human.

14. The authentication device according to claim 11, wherein the processor does not recognize that the user is a pre-registered user based on the biometric information included in the response when the result does not indicate that the user is a real human.

15. The authentication device according to claim 10, wherein the second direction is different from the first direction.

16. The authentication device according to claim 1, wherein the second period is different from the first period.

17. The authentication device according to claim 1, wherein the first biometrics information is a first facial image of the user in response to the first instruction.

18. The authentication device according to claim 1, wherein the second biometrics is a voice of the user in response to the second instruction.

19. The authentication device according to claim 1, wherein the third biometrics is a second facial image of the user in response to the third instruction.

20. The authentication device according to claim 1, wherein the second information corresponds to the first period of time the face of the user continuously keeps facing in a first direction of the first information in a stationary state.

21. The authentication device according to claim 1, wherein the fourth information corresponds to the second period of time the user has to perform the second challenge.

22. The authentication device according to claim 1, wherein the sixth information corresponds to the third period of time the face of the user continuously keeps facing in a second direction of the fifth information in a stationary state.

23. An authentication device comprising:
a memory configured to store instructions; and
a processor configured to execute the instructions to:
output a first instruction, the first instruction comprising first information and second information, the first information requesting a user to perform a first challenge, and the second information corresponding to a first period of time the user has to perform the first challenge;
output a second instruction, the second instruction comprising third information and fourth information, the third information requesting the user to perform a second challenge, and the fourth information corresponding to a second period of time the user has to perform the second challenge;
output a third instruction, the third instruction comprising fifth information and sixth information, the fifth information requesting the user to perform a third challenge, and the sixth information corresponding to a third period of time the user has to perform the third challenge;
capture first biometrics information of the user in response to the first instruction;
capture second biometrics information of the user in response to the second instruction;
capture third biometrics information of the user in response to the third instruction; and
authenticate access based on the captured first biometrics information, the second biometrics information, and the captured third biometrics information,
wherein the processor is further configured to authenticate access to an external device in a case where the first period of time the user has to perform the first challenge satisfies the second information, the second period of time the user has to perform the second challenge satisfies the fourth information, the third period of time the user has to perform the third challenge satisfies the sixth information, and the response to the first instruction, the response to the second instruction, and the response to the third instruction are correct.

24. The authentication device according to claim 23, wherein the processor is further configured to deny access to an external device when the first period of time the user continuously keeps facing in a first direction after moving the face of the user towards the first direction does not satisfy the second information, when the second period of time the user has to perform the second challenge does not satisfy the fourth information, when the third period of time the user continuously keeps facing in a second direction after moving the face of the user towards the second direction does not satisfy the sixth information, when a movement of the face of the user in a direction represented in a facial image input in the response corresponding to the first instruction, when a movement of the face of the user in a direction represented in a second facial image input in the response corresponding to the third instruction is incorrect, or when the response to the second information is incorrect.

25. A method of authenticating a user comprising:
outputting a first instruction, the first instruction comprising first information and second information, the first information requesting a user to perform a first challenge, and the second information corresponding to a first period of time the user has to perform the first challenge;
outputting a second instruction, the second instruction comprising third information and fourth information, the third information requesting the user to perform a second challenge, and the fourth information corresponding to a second period of time the user has to perform the second challenge;
outputting a third instruction, the third instruction comprising fifth information and sixth information, the fifth information requesting the user to perform a third challenge, and the sixth information corresponding to a third period of time the user has to perform the third challenge;
capturing first biometrics information of the user in response to the first instruction;
capturing second biometrics information of the user in response to the second instruction;
capturing third biometrics information of the user in response to the third instruction; and
outputting a result in a case where the first period of time the user has to perform the first challenge satisfies the second information, the second period of time the user has to perform the second challenge satisfies the fourth information, the third period of time the user has to perform the third challenge satisfies the sixth information, and the response to the first instruction, the response to the second instruction, and the response to the third instruction are correct.

26. The method of claim 25, wherein the result does not indicate that the user is a real human when the first period of time the user continuously keeps facing in a first direction after moving the face of the user towards the first direction does not satisfy the second information, when the second period of time the user has to perform the second challenge does not satisfy the fourth information, when the third period of time the user continuously keeps facing in a second direction after moving the face of the user towards the second direction does not satisfy the sixth information, when a movement of the face of the user in a direction represented in a first facial image input in the response corresponding to the first instruction, when a movement of the face of the user in a direction represented in a second facial image input in the response corresponding to the third instruction is incorrect, or when the response to the second information is incorrect.

27. The method of claim 26, wherein the second direction is different from the first direction.

28. The method of claim 25, wherein the second period is different from the first period.

29. The method of claim 25, wherein the first biometrics information is a first facial image of the user in response to the first instruction.

30. The method of claim 25, wherein the second biometrics is a voice of the user in response to the second instruction.

31. The method of claim 25, wherein the third biometrics is a second facial image of the user in response to the third instruction.

32. The method of claim 25, wherein the second information corresponds to the first period of time the face of the user continuously keeps facing in a first direction of the first information in a stationary state.

33. The method of claim 25, wherein the fourth information corresponds to the second period of time the user has to perform the second challenge.

34. The method of claim 25, wherein the sixth information corresponds to the third period of time the face of the user continuously keeps facing in a second direction of the fifth information in a stationary state.

35. A non-transitory computer readable medium having stored therein a program for performing a method of authenticating a user comprising:
   outputting a first instruction, the first instruction comprising first information and second information, the first information requesting a user to perform a first challenge, and the second information corresponding to a first period of time the user has to perform the first challenge;
   outputting a second instruction, the second instruction comprising third information and fourth information, the third information requesting the user to perform a second challenge, and the fourth information corresponding to a second period of time the user has to perform the second challenge;
   outputting a third instruction, the third instruction comprising fifth information and sixth information, the fifth information requesting the user to perform a third challenge, and the sixth information corresponding to a third period of time the user has to perform the third challenge;
   capturing first biometrics information of the user in response to the first instruction;
   capturing second biometrics information of the user in response to the second instruction;
   capturing third biometrics information of the user in response to the third instruction; and
   outputting a result in a case where the first period of time the user has to perform the first challenge satisfies the second information, the second period of time the user has to perform the second challenge satisfies the fourth information, the third period of time the user has to perform the third challenge satisfies the sixth information, and the response to the first instruction, the response to the second instruction, and the response to the third instruction are correct.

36. The non-transitory computer readable medium of claim 35, wherein the result indicates that the user is a real human when the first period of time the user continuously keeps facing in a first direction after moving the face of the user towards the first direction satisfies the second information, when the second period of time the user has to perform the second challenge satisfies the fourth information, when the third period of time the user continuously keeps facing in a second direction after moving the face of the user towards the second direction satisfies the sixth information, and when the response to the first instruction, the response to the second information and the response to the third information are correct, and
   wherein the second direction is different from the first direction.

37. The non-transitory computer readable medium of claim 35, wherein the second period is different from the first period.

38. The non-transitory computer readable medium of claim 35, wherein the first biometrics information is a first facial image of the user in response to the first instruction.

39. The non-transitory computer readable medium of claim 35, wherein the second biometrics is a voice of the user in response to the second instruction.

40. The non-transitory computer readable medium of claim 35, wherein the third biometrics is a second facial image of the user in response to the third instruction.

41. The non-transitory computer readable medium of claim 35, wherein the second information corresponds to the first period of time the face of the user continuously keeps facing in a first direction of the first information in a stationary state.

42. The non-transitory computer readable medium of claim 35, wherein the fourth information corresponds to the second period of time the user has to perform the second challenge.

43. The non-transitory computer readable medium of claim 35, wherein the sixth information corresponds to the third period of time the face of the user continuously keeps facing in a second direction of the fifth information in a stationary state.

* * * * *